United States Patent
Komatsu (10) Patent No.: US 7,056,850 B2
(45) Date of Patent: Jun. 6, 2006

(54) WEAR-RESISTANT SILICON NITRIDE MEMBER AND METHOD OF MANUFACTURE THEREOF

(75) Inventor: Michiyasu Komatsu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 10/484,717

(22) PCT Filed: Jul. 23, 2002

(86) PCT No.: PCT/JP02/07435

§ 371 (c)(1),
(2), (4) Date: Jan. 26, 2004

(87) PCT Pub. No.: WO03/010113

PCT Pub. Date: Feb. 6, 2003

(65) Prior Publication Data

US 2004/0191535 A1 Sep. 30, 2004

(30) Foreign Application Priority Data

Jul. 24, 2001 (JP) .............................. 2001-223534

(51) Int. Cl.
*C04B 35/596* (2006.01)
*C04B 35/577* (2006.01)

(52) U.S. Cl. .................. 501/97.2; 501/97.3; 501/97.4; 501/92

(58) Field of Classification Search .................. 501/92, 501/97.1–97.4; 264/664, 665
See application file for complete search history.

(56) References Cited

U.S. PATENT DOCUMENTS

| | | | | |
|---|---|---|---|---|
| 4,327,187 A | | 4/1982 | Komatsu et al. | |
| 5,100,847 A | * | 3/1992 | Li et al. | 501/97.2 |
| 5,187,127 A | | 2/1993 | Goto et al. | 501/95 |
| 5,369,065 A | * | 11/1994 | Yoshimura et al. | 501/97.4 |
| 5,394,015 A | * | 2/1995 | Tsuzuki et al. | 264/662 |
| 5,575,571 A | * | 11/1996 | Takebayashi et al. | 384/492 |
| 5,635,431 A | | 6/1997 | Ikeda et al. | |
| 6,613,443 B1 | | 9/2003 | Komatsu et al. | |

FOREIGN PATENT DOCUMENTS

| | | | |
|---|---|---|---|
| EP | 0691483 | * | 10/1996 |
| JP | 63-35454 | | 2/1988 |
| JP | 63-134567 | | 6/1988 |
| JP | 2-221160 | | 9/1990 |
| JP | 3-5371 | * | 1/1991 |
| JP | 4-260669 | | 9/1992 |
| JP | 5-238829 | | 9/1993 |
| JP | 7-118070 | | 5/1995 |
| JP | 9-20563 | | 1/1997 |
| JP | 9-142935 | | 6/1997 |
| JP | 2000-233974 | * | 8/2000 |
| JP | 2001-192273 | * | 7/2001 |

* cited by examiner

*Primary Examiner*—Karl Group
(74) *Attorney, Agent, or Firm*—Oblon, Spivak, McClelland, Maier & Neustadt, P.C.

(57) ABSTRACT

The present invention provides a wear resistant member composed of silicon nitride sintered body containing 2–10 mass % of rare earth element in terms of oxide thereof as sintering agent, 2–7 mass % of $MgAl_2O_4$ spinel, 1–10 mass % of silicon carbide, and 5 mass % or less of at least one element selected from the group consisting of Ti, Zr, Hf, W, Mo, Ta, Nb and Cr in terms of oxide thereof, wherein a porosity of said silicon nitride sintered body is 1 vol. % or less, a three-point bending strength is 900 MPa or more, and a fracture toughness is 6.3 MPa·m$^{1/2}$ or more. According to the above structure of the present invention, there can be provided a silicon nitride wear resistant member and a method of manufacturing the member having a high strength and a toughness property, and particularly excellent in rolling and sliding characteristics.

8 Claims, 1 Drawing Sheet

FIG. 1

WEAR-RESISTANT SILICON NITRIDE MEMBER AND METHOD OF MANUFACTURE THEREOF

TECHNICAL FIELD

The present invention relates to a wear resistant member mainly composed of silicon nitride and a method of manufacturing the member, and more particularly to a silicon nitride wear resistant member and a method of manufacturing the member capable of exhibiting excellent wear resistance, particularly rolling life characteristics when the wear resistant member is used as rolling bearing member, and is suitable as a material for constituting a rolling bearing member requiring an excellent durability, and the wear resistant member also having a high density equal to or higher than the conventional silicon nitride sintered body and a high mechanical strength which is inherent to the silicon nitride sintered body, even if the sintered body is manufactured through a sintering operation under a low temperature of 1600° C. or lower.

BACKGROUND ART

Various sintering compositions for the silicon nitride sintered bodies are well known: such as silicon nitride/oxide of rare earth element/aluminum oxide system; silicon nitride/yttrium oxide/aluminum oxide/aluminum nitride system; and silicon nitride/oxide of rare earth element/aluminum oxide/titanium oxide system or the like. Sintering assistant agents composed of the oxides of rare earth elements, such as yttrium oxide ($Y_2O_3$) in the sintering compositions listed above, have a function of generating grain boundary phase (liquid phase) composed of Si-rare earth element-Al—O—N or the like during the sintering operation. Therefore, the sintering assistant agents are added to a material composition for enhancing the sintering characteristics of sintering materials, and achieve high density and high strength of the sintered bodies.

According to the conventional art, the silicon nitride sintered bodies are generally mass-produced as follows. After a sintering assistant agent as mentioned above is added to the material powder of silicon nitride, the material mixture is molded to form a compact. Thus obtained compact is then sintered in a sintering furnace at a high temperature of about 1,700–1,900° C. for a predetermined period of time.

However, in the conventional manufacturing method described above, since the sintering temperature was greatly high to be about 1700 to 1900° C., there had been raised the following problems. That is, it was required to upgrade a heat-resistant specification for the sintering furnace and ancillary equipments thereof, so that an installation cost of the manufacturing facilities was greatly increased. Further, it was difficult to adopt a continuous manufacturing process, so that a manufacturing cost of the silicon nitride sintered body was remarkably increased and a mass-productivity of the sintered body was disadvantageously lowered.

In addition, although the silicon nitride sintered body produced by the conventional method achieves an improved bending strength, fracture toughness and wear resistance, however, the improvement is insufficient. A durability as a rolling bearing member requiring a particularly excellent sliding property is insufficient, so that a further improvement has been demanded.

In these days, a demand of ceramic material as precision device members has increased. In these applications, advantages such as high hardness and light weight together with high corrosion resistance and low thermal expansion property of the ceramic are utilized. In particular, in view of the high-hardness and high wear resistance, application as a wear resistant member for constituting a sliding portion of the bearing or the like has been rapidly extended.

However, in a case where rolling balls of a bearing or the like were constituted by the wear resistant member composed of ceramic, when the rolling balls were rolled while being repeatedly contacted with counterpart at a high stress level, the rolling life of the wear resistant member was not sufficient yet. Therefore, a surface of the wear resistant member is peeled off and the member causes cracks, so that the defective member was liable to causes vibration and damage to a device equipped with the bearing. At any rate, there had been posed a problem that the durability and reliability as a material for constituting the parts of the device was low.

The present invention had been achieved for solving the aforementioned problems. Accordingly, an object of the present invention is to provide a wear resistant member and a method of manufacturing the member excellent in wear resistance, particularly excellent in rolling life characteristics that are suitable as rolling bearing member, in addition to a high density equal to or higher than the conventional silicon nitride sintered body and a high mechanical strength which is inherent to the silicon nitride sintered body, even if the sintered body is manufactured through a sintering operation under a low temperature of 1600° C. or lower.

DISCLOSURE OF THE INVENTION

In order to attain the objects described above, the inventors of the present invention had studied the effects and influences of parameters such as the type of silicon nitride material powder, sintering assistant agent and additives, the amounts thereof, and the sintering conditions on the characteristics of the final products (i.e., the sintered bodies) by performing experiments.

As a result, the experiments provided the following findings. That is, a sintering property was greatly improved, when certain amounts of a rare earth element, $MgAl_2O_4$ spinel or a mixture of magnesium oxide and aluminum oxide, silicon carbide, at least one element selected from the group consisting of Ti, Zr, Hf, W, Mo, Ta, Nb and Cr, were added to a fine material powder of silicon nitride to prepare a material mixture.

Further, when the material mixture was molded and sintered at a low temperature of 1600° C. or lower; or when the sintered body after completion of the sintering operation was further subjected to a hot isostatic pressing (HIP) treatment under predetermined conditions, a wear resistant member composed of a silicon nitride sintered body having an excellent wear resistance and a particularly excellent rolling life of sliding property could be obtained in addition to high density and high mechanical strength property that were equal to or higher than those of conventional silicon nitride sintered body.

The present invention had been achieved on the basis of the aforementioned findings.

That is, according to the present invention, there is provided a wear resistant member composed of silicon nitride sintered body containing 2–10 mass % of rare earth element in terms of oxide thereof as sintering agent, 2–7 mass % of $MgAl_2O_4$ spinel, 1–10 mass % of silicon carbide, and 5 mass % or less of at least one element selected from the group consisting of Ti, Zr, Hf, W, Mo, Ta, Nb and Cr in terms of oxide thereof, wherein a porosity of said silicon nitride sintered body is 1 vol. % or less, a three-point bending strength is 900 MPa or more, and a fracture toughness is 6.3 MPa·m$^{1/2}$ or more.

Further, the same function and effect can be obtained even in a case where a mixture of magnesium oxide and aluminum oxide is added as an additive component in place of MgAl$_2$O$_4$ spinel. Therefore, according to the present invention, there is provided another wear resistant member composed of silicon nitride sintered body containing 2–10 mass % of rare earth element in terms of oxide thereof as sintering agent, 1–2 mass % of magnesium oxide, 2–5 mass % of aluminum oxide, 1–10 mass % of silicon carbide, and 5 mass % or less of at least one element selected from the group consisting of Ti, Zr, Hf, W, Mo, Ta, Nb and Cr in terms of oxide thereof, wherein a porosity of said silicon nitride sintered body is 1 vol. % or less, a three-point bending strength is 900 MPa or more, and a fracture toughness is 6.3 MPa·m$^{1/2}$ or more.

Further, in the above wear resistant member composed of silicon nitride sintered body, it is preferable that a maximum width of aggregated segregation existing in grain boundary phase of the silicon nitride sintered body is 5 μm or less.

Furthermore, it is preferable that an average width of the aggregated segregation existing in grain boundary phase of the silicon nitride sintered body is 2 μm or less.

When the silicon nitride material mixture is sintered, the sintering assistant agent and compounds of the additive components are transformed into liquid phase thereby to form grain boundary phase. When this liquid phase components in the grain boundary phase are aggregated and segregated to become large, the mechanical strength of the sintered body is lowered. In particular, when the sintered body is used as the wear resistant member, the rolling property is disadvantageously lowered. Therefore, it is preferable that the sintered body has a fine structure in which the maximum width of the aggregated segregation existing in grain boundary phase is 5 μm or less, and the average width of the aggregated segregation is 2 μm or less.

Further, the three point bending strength of the silicon nitride sintered body constituting above wear resistant member is 900 MPa or more and a fracture toughness is 6.3 MPa·m$^{1/2}$ or more. Therefore, there can be also formed a wear resistant member composed of the silicon nitride sintered body such that a rolling life defined as a rotation number of steel balls rolling along a circular track formed on the wear resistant member formed of the silicon nitride sintered body until a surface of the silicon nitride wear resistant member peels off is 1×10$^7$ or more, when the rolling life is measured in such a manner that a circular track having a diameter of 40 mm is set on the wear resistant member, three rolling balls each having a diameter of 9.35 mm and composed of SUJ2 are provided on the circular track, and the rolling balls are rotated on the track at a rotation speed of 1200 rpm under a condition of being applied with a pressing load of 39.2 MPa.

Furthermore, in the above wear resistant member, it is preferable that the silicon nitride sintered body has a crash strength of 200 MPa or more, and a rolling fatigue life defined as a time until a surface of rolling balls composed of the silicon nitride wear resistant member rolling along a circular track formed on a steel plate peels off is 400 hours or more, when the rolling fatigue life is measured in such a manner that three rolling balls each having a diameter of 9.35 mm are formed from the silicon nitride wear resistant member, the three rolling balls are provided on the circular track having a diameter of 40 mm set on the steel plate formed of SUJ2, and the rolling balls are rotated at a rotation speed of 1200 rpm on the track under a condition of being applied with a pressing load so as to impart a maximum contact stress of 5.9 GPa to the balls.

Further, in the wear resistant member according to the present invention, the silicon nitride sintered body contains at most 5 mass % of at least one element selected from the group consisting of Ti, Hf, Zr, W, Mo, Ta, Nb and Cr in terms of oxide thereof.

Further, when the wear resistant member composed of above the silicon nitride sintered body is a rolling bearing member, the wear resistant member can exhibit particularly excellent sliding property and durability.

Further, there is provided a method of manufacturing a wear resistant member composed of silicon nitride sintered body comprising the steps of: preparing a material mixture by adding 2–10 mass % of a rare earth element in terms of the amount of an oxide thereof, 2–7 mass % of MgAl$_2$O$_4$ spinel, 1–10 mass % of silicon carbide, and 5 mass % or less of at least one element selected from the group consisting of Ti, Zr, Hf, W, Mo, Ta, Nb and Cr in terms of oxide thereof, to a silicon nitride powder containing 1.5 mass % or less of oxygen and 90 mass % or more of α-phase type silicon nitride and having an average grain size of 1 μm or less; molding the material mixture to form a compact; and sintering the compact in non-oxidizing atmosphere at a temperature of 1,600° C. or lower thereby to form a wear resistant member composed of silicon nitride sintered body.

In the above manufacturing method, the same function and effect can be obtained even in a case where a mixture of magnesium oxide and aluminum oxide is added as an additive component in place of MgAl$_2$O$_4$ spinel. Therefore, according to the present invention, there is provided another method of manufacturing a wear resistant member composed of silicon nitride sintered body comprising the steps of: preparing a material mixture by adding 2–10 mass % of a rare earth element in terms of the amount of an oxide thereof, 1–2 mass % of magnesium oxide, 2–5 mass % of aluminum oxide, 1–10 mass % of silicon carbide, and 5 mass % or less of at least one element selected from the group consisting of Ti, Zr, Hf, W, Mo, Ta, Nb and Cr in terms of oxide thereof, to a silicon nitride powder containing 1.5 mass % or less of oxygen and 90 mass % or more of α-phase type silicon nitride and having an average grain size of 1 μm or less; molding the material mixture to form a compact; and sintering the compact in non-oxidizing atmosphere at a temperature of 1,600° C. or lower thereby to form a wear resistant member composed of silicon nitride sintered body.

In the above method of manufacturing the wear resistant member, it is preferable that the method further comprises a step of: conducting a hot isostatic pressing (HIP) treatment to the silicon nitride sintered body in non-oxidizing atmosphere of 30 MPa or more at a temperature of 1,600° C. or lower after completion of the sintering step.

According to the above manufacturing method, the oxide of rare earth element, MgAl$_2$O$_4$ spinel or the mixture of magnesium oxide and aluminum oxide, silicon carbide, and compound of Ti, Zr, Hf or the like are added to the silicon nitride material powder when the silicon nitride sintered body constituting the wear resistant member is prepared. Therefore, MgAl$_2$O$_4$ spinel together with the oxide of rare earth element such as yttrium oxide or the like react with silicon nitride material powder to generate the liquid phase having a low melting point and function as sintering promoting agent, so that a densification of the molded body can be advanced at low temperature of 1600° C. or lower, and the sintering assistant agent exhibits a function of suppressing grain growth in the crystal structure whereby the structure of the sintered body is made fine and the mechanical strength is improved.

Further, silicon carbide (SiC) is solely dispersed as particles in a structure of the sintered body, and has a function of significantly improving the rolling fatigue characteristics of the silicon nitride sintered body. On the other hand, the compound of Ti, Zr, Hf or the like promotes the function as the sintering assistant agent of rare earth element oxide or the like, and the compound also has a function of dispersion-reinforcing the crystal structure as the same manner as SiC, thereby to improve the mechanical strength of the sintered body. As a result, there can be obtained a wear resistant member composed of silicon nitride sintered body having a fine structure and excellence in mechanical properties such that a maximum width of aggregated segregation existing in grain boundary phase is 5 μm or less and an average width of aggregated segregation is 2 μm or less, the maximum size of the pores is 0.4 μm or less, porosity is 1 vol. % or less, three point bending strength at room temperature is 900 MPa or more, fracture toughness of 6.3 MPa·m$^{1/2}$ or more and crush strength is 200 MPa or more, and having excellent mechanical properties.

To achieve good sintering characteristic, high bending strength, high fracture toughness value and long rolling life of the product, the silicon nitride fine powder which is used in the method of the invention and contained as a main component in the sintered body constituting the wear resistant member of the invention preferably contains at most 1.7 mass %, preferably, 0.7–1.5 mass % of oxygen and 90 mass % or more, more preferably, 92–97 mass % of alpha-phase type silicon nitride, and further the powder has fine grains, that is, an average grain size of at most 1 μm, more preferably about 0.4–0.8 μm.

By the way, as the silicon nitride material powder, two types of α-phase type $Si_3N_4$ powder and β-phase type $Si_3N_4$ powder have been known. However, when a sintered body is formed from the α-phase type $Si_3N_4$ powder, there is a tendency that a strength is liable to be insufficient. In contrast, in case of the β-phase type $Si_3N_4$ powder, although a high temperature is required for the sintering operation, there can be obtained a sintered body having a high strength and a structure in which a number of silicon nitride fibers each having a large aspect ratio are tangled in a complicate manner.

In this connection, in the present invention, since the sintered body is prepared by sintering α-phase type $Si_3N_4$ material powder at a low temperature of 1600° C. or lower, there can be obtained a sintered body in which α-phase type $Si_3N_4$ crystal grains and β-phase type $Si_3N_4$ crystal grains are coexisting in the crystal structure. Accordingly, since a small amount of α-phase type $Si_3N_4$ crystal grains coexists among the β-phase type $Si_3N_4$ crystal grains, a substantial structure of a composite material is formed, so that the strength and toughness value of the sintered body can be improved.

In this invention, a reason why a blending amount of α-phase type $Si_3N_4$ powder is limited to a range of 90 mass % (wt %) or more is as follows. That is, when the amount is set to a range of 90 mass % or more, a bending strength, fracture toughness and rolling life of the $Si_3N_4$ sintered body are greatly increased thereby to further improve the excellent characteristics of the silicon nitride. On the other hand, the amount is limited to at most 97 mass % in view of the sintering property. It is more preferable to set the range to 92–95 mass %.

As a result, in order to achieve a good sintering characteristic, high bending strength, high fracture toughness and long rolling life of the product, as a starting material powder of the silicon nitride, it is preferable to use the silicon nitride fine powder containing at most 1.7 mass %, preferably, 0.7–1.5 mass % of oxygen, and at least 90 mass % of alpha-phase type silicon nitride, and further the powder has fine grains, that is, an average-grain size of at most 1 g m, more preferably about 0.4–0.8 μm.

In particular, the use of a fine powder of silicon nitride having an average grain size of 0.7 μm or less facilitates forming a dense sintered body having a porosity of at most 1% by volume without requiring a large amount of a sintering assistant agent. The porosity of the sintered body can be easily measured in accordance with a Archimedes' method.

A total oxygen content contained in the silicon nitride sintered body constituting the wear resistant member of the present invention is specified to 4.5 mass % or less. When the total oxygen content in the sintered body exceeds 4.5 mass %, a maximum size of the pore formed in the grain boundary phase is disadvantageously increased, and the pore is liable to be a starting point of a fatigue failure, thereby to lower the rolling (fatigue) life of the wear resistant member. A preferable range of the total oxygen content is 4 mass % or less.

By the way, the term "total oxygen content of the sintered body" specified in the present invention denotes a total amount in terms of mass % of oxygen constituting the silicon nitride sintered body. Accordingly, when the oxygen exists in the silicon nitride sintered body as compounds such as metal oxide, oxidized nitride or the like, the total oxygen content is not an amount of the metal oxide (and oxidized nitride) but an amount of oxygen in the metal oxide (and the oxidized nitride).

The maximum pore size formed in the grain boundaries of the silicon nitride sintered body constituting the wear resistant member of the present invention is preferably specified to 0.4 μm or less. When the maximum pore size exceeds 0.4 μm, the pore is liable to particularly be a starting point of a fatigue failure, thereby to lower the rolling (fatigue) life of the wear resistant member. A preferable range of the maximum pore size (diameter) is 0.2 μm or less.

Examples of the rare earth element to be added as a sintering assistant agent to a silicon nitride powder are Y, Ho, Er, Yb, La, Sc, Pr, Ce, Nd, Dy, Sm and Gd. Such a rare earth element may be added to the silicon nitride powder in the form of an oxide thereof or a substance which is changed into an oxide thereof during the sintering process. Two or more kinds of such oxide or substance may be added to the silicon nitride powder in a combination manner, Such a sintering assistant agent reacts with the silicon nitride powder so as to form a liquid phase and thereby serves as a sintering promoter.

The amount of a sintering assistant agent to be added to the material powder is set to be within a range of from 2 to 10 mass % in terms of the amount of an oxide thereof. If the amount is less than 2 mass %, the sintered body fails to achieve a sufficiently high density and high strength. In particular, when an element which has a large atomic weight like lanthanoid is used as the rare earth element at above less amount, a sintered body having a relatively low strength and relatively low thermal conductivity is formed.

On the other hand, if the amount is more than 10 mass %, an excessively large portion of the grain boundary phase is formed, and the generation of pore is increased, thereby reducing the strength of the sintered body. For this reason, the amount of a sintering assistant agent is within the range described above. For the same reason described above, the more preferred range of the amount of a sintering assistant agent is 3 to 8 mass %.

In the present invention, $MgAl_2O_4$ spinel together with rare earth element oxide such as yttrium oxide or the like to be used as addition components react with silicon nitride material powder to generate the liquid phase having a low melting point and function as sintering promoting agent, so that a densification of the sintered body at low temperature of 1600° C. or lower can be performed, and $MgAl_2O_4$ spinel exhibits a function of controlling and suppressing grain growth in the crystal structure whereby the structure of $Si_3N_4$ sintered body is made fine and the mechanical strength is improved. Further, $MgAl_2O_4$ spinel functions to lower a transition temperature at which α-phase type silicon nitride is transformed into β-phase type silicon nitride, so that the densification is advanced at a low temperature. Therefore, α-phase type silicon nitride phase should be remained to some extent in the crystal structure after the sintering operation whereby to increase strength and fracture toughness value of the resultant sintered body.

The same function and effect can be obtained even in a case where a mixture of magnesium oxide (MgO) and aluminum oxide ($Al_2O_3$) is added as additive components in place of $MgAl_2O_4$ spinel. In this case, an addition amount of MgO is specified to a range of 1–2 mass %. If the addition amount of MgO is less than 1 mass %, the densification of the sintered body becomes insufficient. On the other hand, if the amount is excessively large so as to exceed 2 mass %, the strength of the sintered body and the rolling fatigue characteristic as a wear resistant member are disadvantageously lowered.

Further, an addition amount of $Al_2O_3$ is specified to a range of 2–5 mass %. If the addition amount of $Al_2O_3$ is less than 2 mass %, the densification of the sintered body becomes insufficient. On the other hand, if the amount is excessively large so as to exceed 5 mass %, the strength of the sintered body and the rolling fatigue characteristic as a wear resistant member are disadvantageously lowered.

Furthermore, silicon carbide (SiC) to be used as another addition component in the present invention is added within a range of 1–10 mass % for the purpose of being solely dispersed as particles in the crystal structure, and for exhibiting a function of drastically improving the rolling life characteristic of the silicon nitride sintered body. In addition, silicon carbide (SiC) is added for improving the mechanical strength such as bending strength and fracture toughness value or the like of the $Si_3N_4$ sintered body.

When the addition amount of silicon carbide (SiC) is less than 1 mass %, the sintered body fails to achieve a sufficiently addition effect. On the other hand, when the addition amount is excessively large to exceed 10 mass %, the densification of the sintered body becomes insufficient thereby to lower the bending strength of the sintered body. For this reason, the addition amount of SiC is set to the range of 1–10 mass %, preferably to a range of 3–7 mass %. In particular, in order to secure good performances together with sintering property, strength and rolling life, it is preferable to set the addition amount of SiC to a range of 3.5–6 mass %.

In this regard, there exist two types of silicon carbides i.e., α-type and β-type silicon carbides. However, both α-type and β-type silicon carbides exhibit the same function and effect to each other.

Further, in the present invention, at least one element selected from the group consisting of Ti, Hf, Zr, W, Mo, Ta, Nb and Cr is also added as another component at an amount of 5 mass % or less. These elements to be used as another addition component are added to the silicon nitride material powder as oxides, carbides, nitrides, silicides and borides thereof. These compounds promote the sintering assistant effect of the rare earth element, and also function to further lower the transition temperature at which α-phase type silicon nitride is transformed into β-phase type silicon nitride, and also promote dispersion thereof in the crystal structure so as to enhance the mechanical strength of the silicon nitride ($Si_3N_4$) sintered body. Among them, compounds of Ti, Zr and Hf are particularly preferred.

If the addition amount of these compounds is less than 0.3 mass %, the sintered body fails to achieve a sufficiently addition effect. On the other hand, if the amount is excessively large so as to exceed 5 mass %, the mechanical strength and rolling life of the sintered body are disadvantageously lowered. For this reason, the preferred range of the amount of these compounds contained is at most 5 mass %. In particular, the amount is more preferably set to a range of 0.5–3 mass %.

The above compounds such as Ti, Zr, Hf or the like also serve as light blocking agents (light shielding agents). More specifically, they color the silicon nitride type ceramic sintered body black and thus provides it with an opacity.

Further, since the porosity of the sintered body has a great influence on the rolling life and bending strength of the wear resistant member, so that the sintered body should be manufactured so as to provide the porosity of 1 vol. % or less. If the porosity exceeds 1% by volume, the pore to be a starting point of the fatigue failure is rapidly increased, thereby to lower the strength of the sintered body and shorten the rolling life of the wear resistant member.

The silicon nitride sintered body constituting the wear resistant member according to the present invention can be produced by, for example, the following processes. A material mixture is prepared by adding predetermined amount of a sintering assistant agent, $MgAl_2O_4$ spinel or the mixture of magnesium oxide and aluminum oxide, silicon carbide, a required additive such as an organic binder, and a compound of Ti or the like, to a fine powder of silicon nitride which has a predetermined fine average grain size and contains very small amount of oxygen. The material mixture is then molded into a compact having a predetermined shape. As a method of molding the material mixture, conventional molding methods such as the die-pressing method or the doctor-blade method, rubber-pressing method, CIP (cold isostatic pressing) method or the like can be applied.

In a case where the molded compact is prepared through the above die-press-molding method, in order to particularly form a grain boundary hardly causing the pores or voids, it is preferable to set the molding pressure for the material mixture to 120 MPa or more. When the molding pressure is less than 120 MPa, there are easily formed portions (segregated portions) to which the compound of rare earth element as component mainly constituting the grain boundary is agglomerated, and the compact cannot be sufficiently densified, so that there is obtained a sintered body with many crack-formations.

Further, the above agglomerated portion (segregated portion) in the grain boundary is liable to become a starting point of fatigue failure, thus lowering the life and durability of the wear resistant member. On the other hand, when the molding pressure is set to an excessively large value so as to exceed 200 MPa, a durability of the molding die is disadvantageously lowered, and it cannot be always said that the productivity is good. Therefore, the above molding pressure is preferably set to a range of 120–200 MPa.

Subsequent to the above molding process, the molded compact is heated and maintained at 600–800° C. for 1–2 hours in a non-oxidizing atmosphere or at 400–500° C. for 1–2 hours in the air, thereby degreasing the compact, that is, thoroughly removing the organic binder component added in the material mixture preparing process.

The degreased compact is then sintered by normal-pressure-sintering method or pressured-sintering method at a temperature of 1,600° C. or lower for 0.5–10 hours in non-oxidizing atmosphere filled with inert gas such as argon gas or nitrogen gas or hydrogen gas. As the pressured-sintering method, various press-sintering methods such as a pressurized-atmosphere sintering method, hot-pressing method, HIP (hot isostatic pressing) method or the like can be utilized.

In addition, when the silicon nitride sintered body is further subjected to a hot isostatic pressing (HIP) treatment under a temperature condition of 1,600° C. or lower in non-oxidizing atmosphere of 30 MPa or lower, an influence of the pore constituting a starting point of fatigue failure of the sintered body can be further reduced, so that there can be obtained a wear resistant member having a further improved sliding property and rolling life characteristics.

The silicon nitride wear resistant member produced by the above method achieves a total oxygen content of 4.5 mass % or less, a porosity of 1% or less, a maximum pore size (diameter) of 0.4 µm or less and excellent mechanical characteristics, that is, a three-point bending strength (at room temperature) of 900 MPa or greater.

Further, there can be also obtained a silicon nitride wear resistant member having a crush strength of 200 MPa or more and a fracture toughness of 6.3 MPa·m$^{1/2}$ or more.

According to the silicon nitride wear resistant member and the method of manufacturing the member of the present invention, the material mixture is prepared by adding the predetermined amounts of the rare earth element, MgAl$_2$O$_4$ spinel or the mixture of magnesium oxide and aluminum oxide, silicon carbide, and compound of Ti, Zr, Hf or the like to the silicon nitride material powder, so that the sintering property is greatly improved. Therefore, even if the molded compact is sintered at a low temperature of 1600° C. or lower, there can be obtained a silicon nitride wear resistant member having an excellent wear resistance, a high density and a high mechanical strength that are equal to or higher than those of conventional silicon nitride sintered body. In particular, the silicon nitride wear resistant member is suitable for a material constituting a rolling bearing member in view of its excellent rolling life characteristics.

In other word, according to the wear resistant member of the present invention, the grain growth of the silicon nitride crystal grains can be suppressed by using the predetermined sintering assistant agent and by setting the sintering temperature to 1600° C. or lower. Since the grain growth can be effectively suppressed, a triple point formed among the silicon nitride crystal grains can be minimized, so that it becomes possible to make a width of the grain boundary phase small.

Further, since the sintering temperature is set to a lower level of 1600° C. or lower, the width of the grain boundary phase formed during the sintering process can be decreased. Simultaneously, an evaporation of the components of the grain boundary phase or impurities contained in the grain boundary phase are prevented from being discharged to outside. Therefore, the generation of pores is suppressed and a maximum size (diameter) of pore can be minimized, so that there can be obtained a wear resistant member excellent in rolling life characteristics and durability. Accordingly, when a bearing device is prepared by using this wear resistant member as rolling bearing member, good sliding/rolling characteristics can be maintained for a long time of period, and there can be provided a rotation machine having excellent operational reliability and durability. Further, as an example of another application, the wear resistant member of this invention can be applied to various fields such as engine parts, various tool material, various rails, various rollers or the like which require an excellent wear resistance.

EXPLANATION OF THE REFERENCE NUMERALS

1—machine body, 2—wear resistant member, 3—rolling steel ball, 4—guide plate, 5—driving rotation shaft, 6—retainer, 7—lubrication oil, 8—rolling ball (made of silicon nitride), 9—bearing steel plate (SUJ2 plate)

BEST MODE FOR EMBODYING THE INVENTION

Next, preferred embodiments of the silicon nitride wear resistant member according to the present invention will be explained more concretely on the basis of the following Examples and Comparative Examples.

EXAMPLES 1–3

A material powder mixture for Examples 1 was prepared by adding 5 mass % of Y$_2$O$_3$ (yttrium oxide) powder having an average grain size of 0.9 µm, 5 mass % of MgAl$_2$O$_4$ spinel powder having an average grain size of 0.5 µm, 5 mass % of β-phase type SiC (silicon carbide) powder having an average grain size of 0.8 µm, and 1 mass % of ZrO$_2$ (zirconium oxide) powder having an average grain size of 0.6 µm, as sintering assistant agents, to 86 mass % of Si$_3$N$_4$ (silicon nitride) material powder containing 1.3 mass % of oxygen, and 97% of α-phase type silicon nitride, and having an average grain size of 0.55 µm, followed by wet-mixing the materials in ethyl alcohol for 96 hours using pulverizing balls as pulverization media formed of silicon nitride, and drying the mixture, thereby to prepare a material powder mixture.

After adding a predetermined amount of an organic binder and a solvent to the material powder mixture, thereby to prepare a blended granulated powder. Then, the granulated powder was press-molded at a molding pressure of 130 MPa, thereby to prepare a number of molded compacts each having a dimension of 50 mm (length)×50 mm (width)×5 mm (thickness) as samples for measuring bending strength and a number of molded compacts each having a dimension of 80 mm (diameter)×6 mm (thickness) as samples for measuring rolling life.

Thereafter, thus prepared molded compacts were degreased in air-flowing atmosphere at temperature of 450° C. for 4 hours. Thereafter, the degreased molded compacts were sintered and densified by holding the compacts in a nitrogen gas (N$_2$) atmosphere under a pressure of 0.7 MPa at a temperature of 1550° C. for 6 hours thereby to prepare a number of silicon nitride wear resistant members of Example 1.

In addition, as Example 2, the manufacturing steps were repeated under the same conditions as in Example 1 except that a hot isostatic pressing (HIP) treatment was performed to the sintered body obtained in Example 1 in such a manner that the sintered body was heated and sintered in nitrogen gas atmosphere of 100 MPa at a temperature of 1500° C. for 6 hours, thereby to prepare a silicon nitride wear resistant member of Example 2.

Further, as Example 3, the manufacturing steps were repeated under the same conditions as in Example 2 except that 1.5 mass % of MgO (magnesium oxide) powder having an average grain size of 0.5 µm and 3.5 mass % of $Al_2O_3$ (aluminum oxide) having an average grain size of 0.8 µm were added in place of $MgAl_2O_4$ spinel powder, thereby to prepare a silicon nitride wear resistant member of Example 3.

COMPARATIVE EXAMPLES 1–4

As Comparative Example 1, the manufacturing steps were repeated under the same conditions as in Example 1 except that the SiC powder was not added to the material mixture thereby to prepare silicon nitride wear resistant member of Comparative Example 1.

Further, as Comparative Example 2, a hot isostatic pressing (HIP) treatment was performed to the sintered body obtained in Comparative Example 1 in such a manner that the sintered body was heated and sintered in nitrogen gas atmosphere of 100 MPa at a temperature of 1500° C. for 1 hour, thereby to prepare silicon nitride wear resistant member of Comparative Example 2.

Furthermore, as Comparative Example-3, the manufacturing steps were repeated under the same conditions as in Example 1 except that 5 mass % of $Al_2O_3$ (aluminum oxide) powder having an average grain size of 0.8 µm was added in place of $MgAl_2O_4$ spinel powder, thereby to prepare silicon nitride wear resistant member of Comparative Example 3.

Still further, as Comparative Example 4, the manufacturing steps were repeated under the same conditions as in Example 2 except that the $Si_3N_4$ (silicon nitride) material powder containing 1.7 mass % of oxygen and 91 mass % of α-phase type silicon nitride, and having an average grain size of 1.5 µm was used, thereby to prepare silicon nitride wear resistant member of Comparative Example 4.

With respect to thus prepared silicon nitride wear resistant members of Examples and Comparative Examples, porosity, maximum width and average width of the agglomerated segregations in the grain boundary, three-point bending strength at room temperature, fracture toughness and rolling life were measured. The fracture toughness was measured by Niihara system based on a micro-indentation method. The measured results are shown in table 1.

In addition, the porosity of the sintered body was measured by Archimedes' method, while the maximum width and average width of the aggregated segregations in the grain boundary phase was measured as follows. Namely, three regions each having a unit area of 100 µm-length×100 µm-width were arbitrarily set on a cross section of the sintered body constituting the wear resistant member, then an enlarged photographic image (magnification of about 5000) was taken with respect to the regions by means of a scanning-type electron microscope (SEM). Among the aggregated segregations shown in the image, a segregation having the largest diameter was selected as a maximum size of the aggregated segregation. Concretely, the maximum width of the aggregated segregation was measured as a diameter of a minimum circle circumscribing the triple-point region formed among the crystal grains.

Further, the average width of the aggregated segregations in the silicon nitride sintered body was calculated as an average value of the segregation widths at 20 sites in the observation field.

In this regard, when the structure of the silicon nitride sintered body is observed through a magnified photograph taken by SEM or the like, the aggregated segregation is revealed and observed with a highlighted color brighter than that of ordinary grain boundary phase. For example, in case of a monochrome photograph, the silicon nitride crystal grains are revealed with a blackish color, while the grain boundary phase is revealed with a white color, and the aggregated segregation is revealed with a highlighted white color. Therefore, the aggregated segregation can be sharply and easily distinguished from the grain boundary phase. Further, if necessary, when an existence of rare earth element is confirmed by EPMA, a concentration of the rare earth element is revealed with a color darker than that of ordinary grain boundary phase, so that the respective constitutional elements can be distinguished from one to other by means of this analyzing method.

Furthermore, the three-point bending strength was measured as follows. That is, bending test pieces each having a dimension of 40 mm (length)×3 mm (width)×4 mm (thickness) were prepared from the respective sintered bodies. Then, the test piece was supported at a supporting span of 30 mm, while a load-applying speed was set to 0.5 mm/min. Under these conditions, the three-point bending strength was measured.

Figure 1:
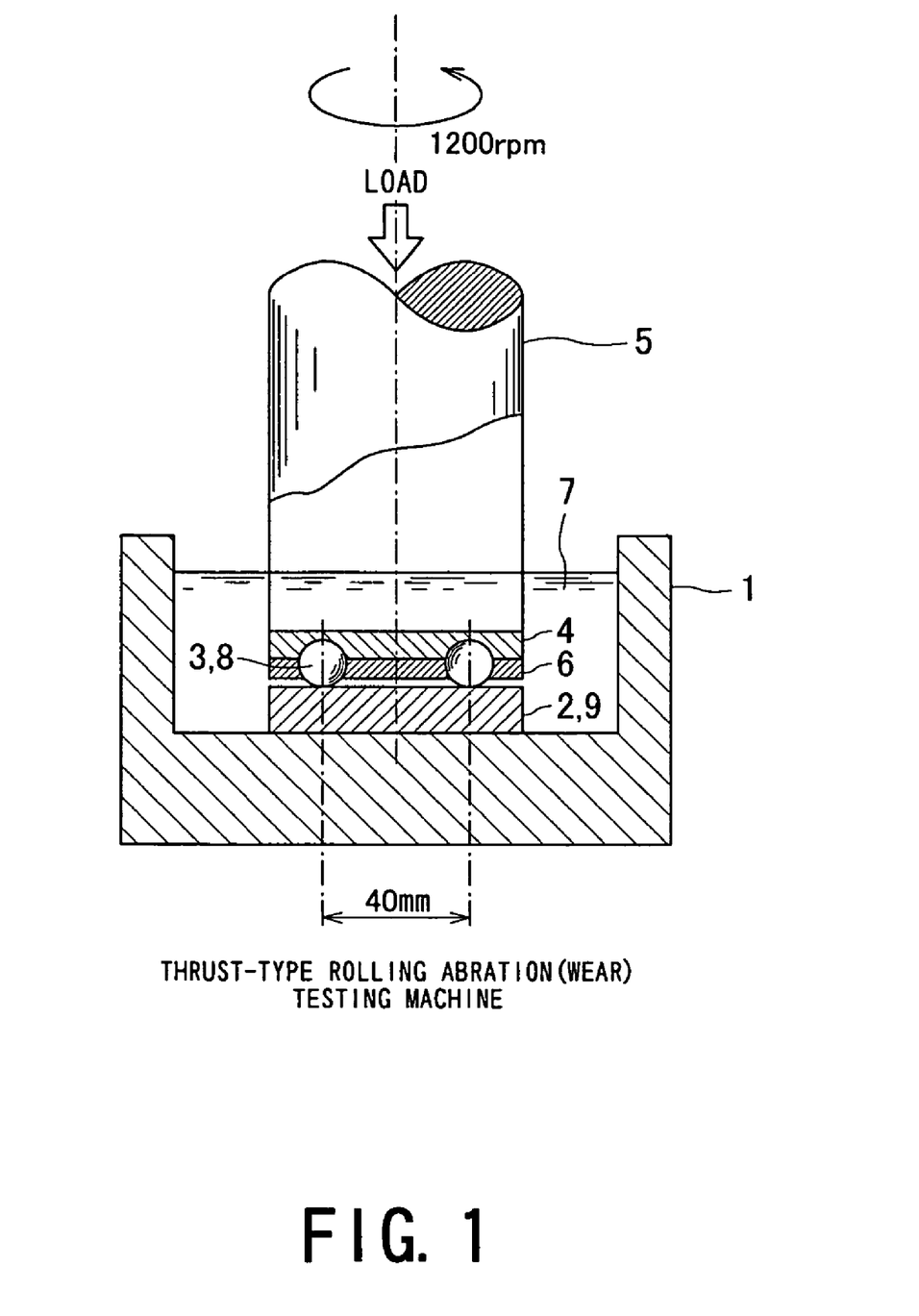
FIG. 1 is a cross sectional view showing a thrust-type rolling abrasion (wear) testing machine for measuring rolling life characteristics of a wear resistant member according to one embodiment of the present invention.

Further, the rolling characteristics of the respective wear resistant members were measured by using a thrust-type rolling abrasion testing machine shown in FIG. 1. This testing machine is constituted by comprising: a plate-shaped wear resistant member 2 disposed in a machine body 1; a plurality of rolling steel balls 3 provided on an upper surface of the wear resistant member 2; a guide plate 4 provided at an upper portion of these rolling steel balls 3; a driving rotation shaft 5 connected to the guide plate 4; and a retainer 6 for regulating a location interval of the rolling steel balls 3. A lubricating oil 7 for lubricating a rolling portion of the balls is poured into the machine body 1. The above rolling steel balls 3 and the guide plate 4 are formed of high-carbon-chromium bearing steel (SUJ2) prescribed by JIS G 4805 (Japanese Industrial Standard). As the above lubricating oil 7, paraffin type lubricating oil (viscosity at 40° C.: 67.2 $mm^2/S$) or turbine oil can be used.

The rolling life of the respective plate-shaped wear resistant members of these embodiments were measured in such a manner that a circular track having a diameter of 40 mm was set on an upper surface of the wear resistant member 2, three rolling steel balls each having a diameter of 9.35 mm and composed of SUJ2 were provided on the circular track, and the rolling steel balls were rotated on the track at a rotation speed of 1200 rpm under a condition of being applied with a pressing load of 439.2 MPa and a condition of lubrication by an oil bath filled with turbine oil thereby to measure the rolling life defined as a rotation number of steel balls rolling along the circular track located on the wear resistant member formed of the silicon nitride sintered body until a surface of the silicon nitride wear resistant member 2 peeled off. The measuring results are shown in Table 1 hereunder.

TABLE 1

| Sample | Porosity (%) | Width of Aggregated Segregation in Liquid Phase(Grain Boundary Phase) (μm) | | Three-Point Bending Strength (MPa) | Fracture Toughness (MPa·m$^{1/2}$) | Rolling Life (rotations) |
|---|---|---|---|---|---|---|
| | | Average | Maximum | | | |
| Example 1 | 0.2 | 0.5 | 1 | 990 | 6.6 | $5 \times 10^7$ |
| Example 2 | 0.02 | 0.6 | 1.5 | 1100 | 6.9 | $>1 \times 10^8$ |
| Example 3 | 0.02 | 0.6 | 1.5 | 1080 | 6.9 | $>1 \times 10^8$ |
| Comparative Example 1 | 0.2 | 3 | 6 | 900 | 6.1 | $2 \times 10^6$ |
| Comparative Example 2 | 0.02 | 3.5 | 6.5 | 1020 | 6.2 | $6 \times 10^6$ |
| Comparative Example 3 | 3.2 | 2.5 | 5.5 | 800 | 5.8 | $4 \times 10^5$ |
| Comparative Example 4 | 1.3 | 3 | 6 | 875 | 6.0 | $1 \times 10^6$ |

As is clear from the results shown in Table 1, in the respective silicon nitride wear resistant members of Examples, each of the sintered bodies constituting the wear resistant members was manufactured so as to contain a predetermined amount of additive components, so that the generation of pores or voids was effectively suppressed and the maximum width of the aggregated segregation was decreased to be fine whereby there could be obtained silicon nitride wear resistant members having good strength characteristics and excellent rolling life and durability. Further, although not shown in Table 1, the maximum size (diameter) of pores formed in the grain boundary phases of the respective wear resistant members according to all Examples was 0.4 μm or less.

On the other hand, in Comparative Example 1 in which the SiC component was not contained, the amount of aggregated segregation of the liquid phase components was increased, thereby to disadvantageously lower the strength characteristics and rolling life.

Further, in a case where the HIP treatment was performed and the SiC component was not contained as in Comparative Example 2, although the three-point bending strength was high, the effect of decreasing the aggregated segregation was insufficient thereby to shorten the rolling life of the wear resistant member.

Furthermore, in case of Comparative Example 3 where only Al$_2$O$_3$ (aluminum oxide) powder was added in place of MgAl$_2$O$_4$ spinel powder, the porosity was disadvantageously large even if the sintering operation was sufficiently performed, and the width of the aggregated segregation became large, so that it was confirmed that both the strength and rolling life were lowered.

Furthermore, in case of Comparative Example 4 where the oxygen content in the silicon nitride material powder was excessively large, the amount of pores generated due to the high oxygen content was large and the width of the aggregated segregation was increased, so that it was confirmed that both the bending strength and rolling life were lowered.

Next, preferred embodiments of the silicon nitride wear resistant member according to the present invention applied to rolling balls of a bearing member will be explained more concretely on the basis of the following Examples and Comparative Examples.

EXAMPLES 1B–3B and COMPARATIVE EXAMPLES 1B–4B

Each of the blended granulated powders as prepared in Examples 1–3 and Comparative Examples 1–4 was packed in the molding die and pressed thereby to prepare spherical primary molded bodies. Then, each of the primary molded bodies was subjected to a rubber pressing treatment at a pressure of 100 MPa, thereby to respectively prepare spherically molded bodies as samples each having a diameter of 11 mm for measuring crush strength and rolling fatigue life.

Next, after the respective spherically molded bodies were subjected to the degreasing treatment and sintering operation under the same conditions as in the corresponding Examples and Comparative Examples, there by to prepare the densified sintered bodies of corresponding Examples and Comparative Examples. Further, thus obtained sintered bodies were subjected to grinding work so as to provide a ball-shape having a diameter of 9.52 mm and a surface roughness of 0.01 μm-Ra thereby to prepare the respective rolling balls for a bearing as wear resistant members of Examples 1B–3B and Comparative Examples 1B–4B.

In this connection, the above surface roughness was measured as an arithmetic average surface roughness (Ra) which can be obtained by scanning the surface on equator of the ball by means of a profilometer-type surface roughness measuring device.

With respect to thus prepared rolling balls as the wear resistant members of Examples and Comparative Examples, porosity, maximum and average widths of aggregated segregations in the grain boundary phase, crush strength at room temperature (25° C.), fracture toughness value and rolling fatigue life were measured.

In this connection, the rolling fatigue life of the respective wear resistant members were measured by using the thrust-type rolling abrasion testing machine shown in FIG. 1. By the way, in the previous Example 1 or the like, an item to be evaluated was a plate-shaped wear resistant member 2 while the balls rolling on the surface of the wear resistant member 2 were the rolling steel balls 3 composed of SUJ2. However, in order to evaluate the silicon nitride rolling balls 8 of Examples 1B–3B and Comparative Examples 1B–4B, a bearing steel plate 9 composed of SUJ2 was provided and assembled in place of the wear resistant member 2.

The rolling fatigue life of the respective rolling ball was measured in such a manner that three rolling balls 8 each having a diameter of 9.52 mm were formed from the silicon nitride wear resistant member, the three rolling balls 8 were provided on the circular track having a diameter of 40 mm set on the upper surface of the steel plate 9 formed of SUJ2, and the rolling balls 8 were rotated at a rotation speed of 1200 rpm on the track under a condition of being applied with a pressing load so as to impart a maximum contact stress of 5.9 GPa to the balls 8 and a lubricating condition using an oil bath filled with turbine oil, thereby to measure the rolling fatigue life defined as a time until a surface of the rolling balls 8 composed of the silicon nitride wear resistant member peeled off. The measured results are shown in Table 2 hereunder.

TABLE 2

| Sample | Porosity (%) | Width of Aggregated Segregation in Liquid Phase(Grain Boundary Phase) (μm) | | Crush Strength (MPa) | Fracture Toughness (MPa·m$^{1/2}$) | Rolling Fatigue Life (hr) |
|---|---|---|---|---|---|---|
| | | Average | Maximum | | | |
| Example 1B | 0.2 | 0.5 | 1 | 220 | 6.6 | >400 |
| Example 2B | 0.02 | 0.5 | 1.5 | 270 | 6.8 | >400 |
| Example 3B | 0.02 | 0.7 | 1.5 | 260 | 6.9 | >400 |
| Comparative Example 1B | 0.2 | 3 | 6 | 200 | 6.1 | 250 |
| Comparative Example 2B | 0.02 | 3.5 | 6.5 | 240 | 6.2 | 300 |
| Comparative Example 3B | 3.4 | 2.5 | 5.5 | 185 | 5.8 | 100 |
| Comparative Example 4B | 1.3 | 3 | 6 | 190 | 6.0 | 200 |

As is clear from the results shown in Table 2, in the respective silicon nitride rolling balls of Examples, each of the sintered bodies constituting the rolling balls was manufactured so as to contain predetermined additive components, so that the generation of the pores was effectively suppressed thereby to decrease the width of aggregated segregations in the grain boundary to be small. Therefore, there could be obtained the silicon nitride rolling balls each having a high crush strength and an excellent durability such that the rolling fatigue life exceeds 400 hours.

On the other hand, in Comparative Example 1B in which SiC was not contained in the balls, a large amount of pores remained in the sintered body thereby to disadvantageously lower the crush strength and the rolling fatigue life. 115 Further, in a case where the HIP treatment was performed and the SiC component was not contained as in Comparative Example 2B, the effect of minimizing the pore size was observed. However, the rolling fatigue life of the wear resistant member was shortened.

Furthermore, in case of Comparative Example 3B where only $Al_2O_3$ was contained in place of $MgAl_2O_4$ spinel, the porosity was disadvantageously increased even if the sintering operation was sufficiently performed, so that it was confirmed that both the crush strength and rolling fatigue life of the wear resistant member were lowered.

Furthermore, in case of Comparative Example 4B where the silicon nitride material powder having an excessively large content of oxygen was used, the amounts of liquid phase component and pores generated due to the high oxygen content were large, so that it was confirmed that any of the porosity, crush strength, fracture toughness value, and rolling fatigue life was insufficient.

In this connection, when the rolling fatigue life of the silicon nitride rolling balls were measured, three rolling balls each having a diameter of 9.52 mm were used. However, even if other balls having different diameters were selected or the number of balls to be provided was changed, it was also confirmed that rolling properties in accordance with the load conditions or the rolling conditions could be obtained.

Next, with respect to a plate-shaped wear resistant member prepared through other compositions or treating conditions than those of the previous Examples will be explained more concretely with reference to the following Examples and Comparative Examples.

EXAMPLES 4–35

Material mixtures for Examples 4–35 were prepared so as to provide composition ratios shown in Tables 34 by blending $Y_2O_3$ powder, $MgAl_2O_4$ spinel powder, SiC powder used in Example 1, oxide powders of various rare earth elements having average grain sizes of 0.9–1 μm as shown in Tables 3–4, MgO powder having an average grain size of 0.5 μm. $Al_2O_3$ powder AlN powder having an average grain size of 1 μm, and powders of various compounds having average grain sizes of 0.4–0.5 μm with $Si_3N_4$ (silicon nitride) material powder used in Example 1.

After thus obtained respective material mixtures were subjected to the molding/degreasing operations under the same conditions as in Example 1, the compacts were subjected to the sintering operation and HIP treatment under the conditions shown in Tables 3–4, thereby to prepare a number of silicon nitride wear resistant members of Examples 4–35.

COMPARATIVE EXAMPLES 5–14

Material mixtures of Comparative Examples 5–14 were respectively prepared as indicated in Tables 34. More specifically, an excessively small amount or an excessive amount of various additives such as oxide of rare earth element such as $Y_2O_3$ or the like, $MgAl_2O_4$ spinel, SiC or the like were added thereby to prepare the material mixtures for the respective Comparative Examples.

After thus obtained respective material mixtures were subjected to the molding/degreasing operations under the same conditions as in Example 4, the compacts were subjected to the sintering operation and HIP treatment under the conditions shown in Tables 34, thereby to manufacture a number of silicon nitride wear resistant members of Comparative Examples 5–14.

With respect to thus prepared plate-shaped silicon nitride wear resistant members of Examples and Comparative Examples, porosity, maximum width and average width of the aggregated segregations formed in the grain boundary phase (liquid phase), three-point bending strength at room temperature, fracture toughness and rolling life of the circular plates were measured under the same conditions as in Example 1. The measured results are shown in Tables 3–4 hereunder.

TABLE 3

| Sample | Material Composition (mass %) | | | | | | Sintering Condition | HIP Condition |
|---|---|---|---|---|---|---|---|---|
| | $Si_3N_4$ | Rare Earth Oxide | | $MgAl_2O_4$ Spinel | SiC | Other | Temp. × Time × Press. (° C.) × (hr) × (MPa) | Temp. × Time × Press. (° C.) × (hr) × (MPa) |
| Example | | | | | | | | |
| 4 | 89 | $Y_2O_3$ | 5 | 5 | 1 | | 1550 × 6 × 0.01 | 1500 × 1 × 100 |
| 5 | 85 | $Y_2O_3$ | 5 | 5 | 5 | | 1550 × 6 × 0.01 | 1500 × 1 × 100 |
| 6 | 80 | $Y_2O_3$ | 5 | 5 | 10 | | 1550 × 6 × 0.01 | 1500 × 1 × 100 |
| 7 | 90 | $Y_2O_3$ | 2 | 5 | 3 | | 1600 × 6 × 0.01 | 1500 × 1 × 100 |
| 8 | 82 | $Y_2O_3$ | 10 | 5 | 3 | | 1600 × 6 × 0.01 | 1500 × 1 × 100 |
| 9 | 90 | $Y_2O_3$ | 5 | 2 | 3 | | 1600 × 6 × 0.01 | 1500 × 1 × 100 |
| 10 | 83 | $Y_2O_3$ | 5 | 7 | 5 | | 1550 × 6 × 0.01 | 1500 × 1 × 100 |
| 11 | 84 | $Y_2O_3$ | 5 | 5 | 5 | $TiO_2$ 1 | 1550 × 6 × 0.01 | 1500 × 1 × 100 |
| 12 | 83 | $Y_2O_3$ | 5 | 5 | 5 | $TiO_2$ 2 | 1550 × 6 × 0.01 | 1500 × 1 × 100 |
| 13 | 80 | $Y_2O_3$ | 5 | 5 | 5 | $TiO_2$ 5 | 1550 × 6 × 0.01 | 1500 × 1 × 100 |
| 14 | 83 | $Y_2O_3$ | 5 | 5 | 5 | $ZrO_2$ 2 | 1550 × 6 × 0.01 | 1500 × 1 × 100 |
| 15 | 83 | $Y_2O_3$ | 5 | 5 | 5 | $HfO_2$ 2 | 1550 × 6 × 0.01 | 1500 × 1 × 100 |
| 16 | 83 | $Y_2O_3$ | 5 | 5 | 5 | WC 2 | 1550 × 6 × 0.01 | 1500 × 1 × 100 |
| 17 | 83 | $Y_2O_3$ | 5 | 5 | 5 | $Mo_2C$ 2 | 1550 × 6 × 0.01 | 1500 × 1 × 100 |
| 18 | 83 | $Y_2O_3$ | 5 | 5 | 5 | $Ta_2O_5$ 2 | 1550 × 6 × 0.01 | 1500 × 1 × 100 |
| 19 | 83 | $Y_2O_3$ | 5 | 5 | 5 | $Nb_2O_5$ 2 | 1550 × 6 × 0.01 | 1500 × 1 × 100 |
| 20 | 83 | $Y_2O_3$ | 5 | 5 | 5 | $Cr_2O_3$ 2 | 1550 × 6 × 0.01 | 1500 × 1 × 100 |
| 21 | 83 | $Y_2O_3$ | 5 | 5 | 5 | $TiO_2$ 1 $ZrO_2$ 1 | 1550 × 6 × 0.01 | 1500 × 1 × 100 |
| 22 | 83 | $Y_2O_3$ | 5 | 5 | 5 | $TiO_2$ 1 $ZrO_2$ 1 | 1600 × 6 × 0.01 | None |
| 23 | 85 | $CeO_2$ | 5 | 5 | 5 | | 1550 × 6 × 0.01 | 1500 × 1 × 100 |
| 24 | 83 | $Er_2O_3$ | 7 | 5 | 5 | | 1550 × 6 × 0.01 | 1500 × 1 × 100 |
| 25 | 83 | $Nd_2O_3$ | 7 | 5 | 5 | | 1550 × 6 × 0.01 | 1500 × 1 × 100 |
| 26 | 83 | $Sm_2O_3$ | 7 | 5 | 5 | | 1550 × 6 × 0.01 | 1500 × 1 × 100 |
| 27 | 83 | $Ho_2O_3$ | 7 | 5 | 5 | | 1550 × 6 × 0.01 | 1500 × 1 × 100 |
| 28 | 83 | $Yb_2O_3$ | 7 | 5 | 5 | | 1550 × 6 × 0.01 | 1500 × 1 × 100 |
| 29 | 83 | $Dy_2O_3$ | 7 | 5 | 5 | | 1550 × 6 × 0.01 | 1500 × 1 × 100 |
| Comparative Example | | | | | | | | |
| 5 | 89 | $Y_2O_3$ | 1 | 5 | 5 | | 1550 × 6 × 0.01 | 1500 × 1 × 100 |
| 6 | 75 | $Y_2O_3$ | 15 | 5 | 5 | | 1550 × 6 × 0.01 | 1500 × 1 × 100 |
| 7 | 89 | $Y_2O_3$ | 5 | 1 | 5 | | 1550 × 6 × 0.01 | 1500 × 1 × 100 |
| 8 | 81 | $Y_2O_3$ | 5 | 9 | 5 | | 1550 × 6 × 0.01 | 1500 × 1 × 100 |
| 9 | 75 | $Y_2O_3$ | 5 | 5 | 15 | | 1550 × 6 × 0.01 | 1500 × 1 × 100 |
| 10 | 78 | $Y_2O_3$ | 5 | 5 | 5 | $TiO_2$ 7 | 1550 × 6 × 0.01 | 1500 × 1 × 100 |

| Sample | Porosity (%) | Width of Aggregated Segregation in Liquid Phase(Grain Boundary Phase) (μm) | | Three-Point Bending Strength (MPa) | Fracture Toughness (MPa·m$^{1/2}$) | Rolling Life of Circular Plate (rotations) |
|---|---|---|---|---|---|---|
| | | Average | Maximum | | | |
| Example | | | | | | |
| 4 | 0.01 | 1 | 2 | 1050 | 6.8 | 6 × 10$^7$ |
| 5 | 0.02 | 0.6 | 1.5 | 1100 | 6.9 | >1 × 10$^8$ |
| 6 | 0.02 | 0.4 | 1 | 1035 | 6.5 | >1 × 10$^8$ |
| 7 | 0.08 | 1.5 | 2.5 | 1000 | 6.5 | >1 × 10$^8$ |
| 8 | 0.02 | 1.5 | 2.5 | 980 | 6.6 | >1 × 10$^8$ |
| 9 | 0.08 | 0.5 | 1 | 1000 | 6.8 | >1 × 10$^8$ |
| 10 | 0.02 | 1 | 2 | 1050 | 6.6 | >1 × 10$^8$ |
| 11 | 0.01 | 0.5 | 1 | 1125 | 6.8 | >1 × 10$^8$ |
| 12 | 0.01 | 0.4 | 1 | 1110 | 6.8 | >1 × 10$^8$ |
| 13 | 0.01 | 0.4 | 1 | 1000 | 6.5 | >1 × 10$^8$ |
| 14 | 0.01 | 0.6 | 1.5 | 1100 | 6.8 | >1 × 10$^8$ |
| 15 | 0.01 | 0.5 | 1 | 1090 | 6.9 | >1 × 10$^8$ |
| 16 | 0.01 | 0.5 | 1 | 1040 | 6.7 | >1 × 10$^8$ |
| 17 | 0.01 | 0.5 | 1 | 1085 | 6.8 | >1 × 10$^8$ |
| 18 | 0.01 | 0.5 | 1 | 1040 | 6.8 | >1 × 10$^8$ |
| 19 | 0.01 | 0.5 | 1 | 1040 | 6.8 | >1 × 10$^8$ |
| 20 | 0.01 | 0.5 | 1 | 1000 | 6.7 | >1 × 10$^8$ |
| 21 | 0.01 | 0.5 | 1 | 1130 | 7.0 | >1 × 10$^8$ |

TABLE 3-continued

| | | | | | | |
|---|---|---|---|---|---|---|
| 22 | 0.2 | 0.3 | 1 | 1050 | 6.9 | $5 \times 10^7$ |
| 23 | 0.01 | 0.6 | 1.5 | 1020 | 6.8 | $>1 \times 10^8$ |
| 24 | 0.01 | 0.5 | 1.5 | 1100 | 7.0 | $>1 \times 10^8$ |
| 25 | 0.01 | 0.5 | 1 | 1070 | 6.5 | $>1 \times 10^8$ |
| 26 | 0.01 | 0.5 | 1.5 | 1050 | 6.5 | $>1 \times 10^8$ |
| 27 | 0.01 | 0.5 | 1 | 1080 | 6.7 | $>1 \times 10^8$ |
| 28 | 0.01 | 0.5 | 1 | 1010 | 6.7 | $>1 \times 10^8$ |
| 29 | 0.01 | 0.5 | 1.5 | 1050 | 6.8 | $>1 \times 10^8$ |
| Comparative Example | | | | | | |
| 5 | 0.2 | 0.7 | 1.5 | 890 | 5.9 | $6 \times 10^6$ |
| 6 | 0.05 | 2 | 4 | 880 | 5.8 | $1 \times 10^6$ |
| 7 | 1.5 | 0.5 | 1 | 890 | 6.4 | $2 \times 10^6$ |
| 8 | 0.01 | 1 | 2 | 900 | 6.3 | $8 \times 10^6$ |
| 9 | 1.5 | 0.3 | 1 | 850 | 5.8 | $2 \times 10^6$ |
| 10 | 0.02 | 0.7 | 1.5 | 890 | 6.3 | $5 \times 10^6$ |

TABLE 4

Plate-Shaped Wear Resistant Member

| | Material Composition (mass %) | | | | | | | Sintering Condition | HIP Condition |
|---|---|---|---|---|---|---|---|---|---|
| Sample | $Si_3N_4$ | Rare Earth Oxide | | $Al_2O_3$ | MgO | SiC | Other | Temp. × Time × Press. (° C.) × (hr) × (MPa) | Temp. × Time × Press. (° C.) × (hr) × (MPa) |
| Example | | | | | | | | | |
| 30 | 86 | $Y_2O_3$ | 5 | 2 | 2 | 5 | | 1550 × 6 × 0.01 | 1500 × 1 × 100 |
| 31 | 84 | $Y_2O_3$ | 5 | 5 | 1 | 5 | | 1550 × 6 × 0.01 | 1500 × 1 × 100 |
| 32 | 84 | $Y_2O_3$ | 5 | 4 | 2 | 5 | | 1550 × 6 × 0.01 | 1500 × 1 × 100 |
| 33 | 86 | $Y_2O_3$ | 5 | 4 | 2 | 3 | | 1550 × 6 × 0.01 | 1500 × 1 × 100 |
| 34 | 83 | $Y_2O_3$ | 5 | 3.5 | 1.5 | 5 | $TiO_2$ 1 $ZrO_2$ 1 | 1550 × 6 × 0.01 | 1500 × 1 × 100 |
| 35 | 83 | $Y_2O_3$ | 5 | 3.5 | 1.5 | 5 | $TiO_2$ 1 $ZrO_2$ 1 | 1550 × 6 × 0.01 | None |
| Comparative Example | | | | | | | | | |
| 11 | 88 | $Y_2O_3$ | 5 | 1 | 1 | 5 | | 1550 × 6 × 0.01 | 1500 × 1 × 100 |
| 12 | 81 | $Y_2O_3$ | 5 | 7 | 2 | 5 | | 1550 × 6 × 0.01 | 1500 × 1 × 100 |
| 13 | 86.5 | $Y_2O_3$ | 5 | 3 | 0.5 | 5 | | 1550 × 6 × 0.01 | 1500 × 1 × 100 |
| 14 | 81 | $Y_2O_3$ | 5 | 5 | 4 | 5 | | 1550 × 6 × 0.01 | 1500 × 1 × 100 |

| Sample | Porosity (%) | Width of Aggregated Segregation in Liquid Phase(Grain Boundary Phase) (μm) | | Three-Point Bending Strength (MPa) | Fracture Toughness (MPa · $m^{1/2}$) | Rolling Life of Circular Plate (rotations) |
|---|---|---|---|---|---|---|
| | | Average | Maximum | | | |
| Example | | | | | | |
| 30 | 0.01 | 0.3 | 1 | 1100 | 6.9 | $>1 \times 10^8$ |
| 31 | 0.01 | 0.5 | 1.5 | 1070 | 6.6 | $>1 \times 10^8$ |
| 32 | 0.01 | 0.6 | 1.5 | 1080 | 6.7 | $>1 \times 10^8$ |
| 33 | 0.01 | 0.8 | 1.5 | 1120 | 7.0 | $>1 \times 10^8$ |
| 34 | 0.01 | 0.4 | 1 | 1110 | 6.9 | $>1 \times 10^8$ |
| 35 | 0.3 | 0.3 | 1 | 1000 | 6.8 | $4 \times 10^7$ |
| Comparative Example | | | | | | |
| 11 | 1.5 | 0.5 | 1 | 880 | 6.2 | $2 \times 10^6$ |
| 12 | 0.01 | 0.8 | 2 | 900 | 6.2 | $7 \times 10^6$ |
| 13 | 1.2 | 0.5 | 1 | 850 | 6.5 | $4 \times 10^6$ |
| 14 | 0.01 | 1.8 | 3.5 | 890 | 6.4 | $5 \times 10^6$ |

As is clear from the results shown in Tables 3–4, in the respective silicon nitride wear resistant members of Examples each of which was manufactured in such a manner that the material powder mixture containing specified additives was molded and sintered, followed by being subjected to HIP treatment as occasion demanded after completion of the sintering process, the generation of the pore was effectively suppressed thereby to enable the width of the aggregated segregations formed in the grain boundary phase to be extremely small. Therefore, there could be obtained the silicon nitride wear resistant members having good strength characteristics and an excellent durability such that the rolling life exceeded $10^8$ for most cases of Examples.

On the other hand, in the silicon nitride sintered bodies as shown in Comparative Examples 5–14 in which the amount of additives such as rare earth components were set to outside the range specified in the present invention, even if the sintering operation or the HIP treatment after the sintering operation were sufficiently performed, the rolling life of the wear resistant members were lowered. Further, it was confirmed that the sintered bodies of Comparative Examples could not satisfy at least one of the required characteristics such as porosity, width of the aggregated segregation, three-point bending strength, fracture toughness value or the like that were specified in the present invention.

Next, preferred embodiments of the wear resistant members of the above Examples 4–35 and Comparative Examples 5–14 applied to rolling balls of a bearing member will be explained more concretely on the basis of the following Examples and Comparative Examples.

EXAMPLES 4B–35B and COMPARATIVE EXAMPLES 5B–14B

Each of the blended granulated powders as prepared in Examples 4–35 and Comparative Examples 5–14 was packed in the molding die and pressed thereby to prepare spherical primary molded bodies. Then, each of the primary molded bodies was subjected to a rubber pressing treatment at a pressure of 100 MPa, thereby to respectively prepare spherically molded bodies as samples each having a diameter of 11 mm for measuring crush strength and rolling fatigue life.

Next, after the respective spherically molded bodies were subjected to the degreasing treatment under the same conditions as in Example 1, the degreased bodies were treated under the conditions of the sintering operations and HIP treatments as shown in tables 5–6. Further, thus obtained sintered bodies were subjected to grinding work so as to provide a ball-shape having a diameter of 9.52 mm and a surface roughness of 0.01 μm-Ra thereby to prepare the respective rolling balls for a bearing as wear resistant members of Examples 4B–35B and Comparative Examples 5B–14B.

In this connection, the above surface roughness was measured as an arithmetic average surface roughness (Ra) obtained by scanning the surface on equator of the ball by means of a profilometer-type surface roughness measuring device.

With respect to thus prepared rolling balls as the wear resistant members of the respective Examples and Comparative Examples, porosity, width of the aggregated segregation, crush strength, fracture toughness value and rolling fatigue life were measured as the same manner as in Example 1B, The measured results are shown in Tables 5–6 hereunder.

TABLE 5

Rolling Ball-Shaped Wear Resistant Member

| Sample | Material Composition (mass %) | | | | | | Sintering Condition | HIP Condition |
|---|---|---|---|---|---|---|---|---|
| | $Si_3N_4$ | Rare Earth Oxide | | $MgAl_2O_4$ Spinel | SiC | Other | | Temp. × Time × Press. (° C.) × (hr) × (MPa) | Temp. × Time × Press. (° C.) × (hr) × (MPa) |
| Example | | | | | | | | | |
| 4B | 89 | $Y_2O_3$ | 5 | 5 | 1 | | | 1550 × 6 × 0.01 | 1500 × 1 × 100 |
| 5B | 85 | $Y_2O_3$ | 5 | 5 | 5 | | | 1550 × 6 × 0.01 | 1500 × 1 × 100 |
| 6B | 80 | $Y_2O_3$ | 5 | 5 | 10 | | | 1550 × 6 × 0.01 | 1500 × 1 × 100 |
| 7B | 90 | $Y_2O_3$ | 2 | 5 | 3 | | | 1600 × 6 × 0.01 | 1500 × 1 × 100 |
| 8B | 82 | $Y_2O_3$ | 10 | 5 | 3 | | | 1600 × 6 × 0.01 | 1500 × 1 × 100 |
| 9B | 90 | $Y_2O_3$ | 5 | 2 | 3 | | | 1600 × 6 × 0.01 | 1500 × 1 × 100 |
| 10B | 83 | $Y_2O_3$ | 5 | 7 | 5 | | | 1550 × 6 × 0.01 | 1500 × 1 × 100 |
| 11B | 84 | $Y_2O_3$ | 5 | 5 | 5 | $TiO_2$ | 1 | 1550 × 6 × 0.01 | 1500 × 1 × 100 |
| 12B | 83 | $Y_2O_3$ | 5 | 5 | 5 | $TiO_2$ | 2 | 1550 × 6 × 0.01 | 1500 × 1 × 100 |
| 13B | 80 | $Y_2O_3$ | 5 | 5 | 5 | $TiO_2$ | 5 | 1550 × 6 × 0.01 | 1500 × 1 × 100 |
| 14B | 83 | $Y_2O_3$ | 5 | 5 | 5 | $ZrO_2$ | 2 | 1550 × 6 × 0.01 | 1500 × 1 × 100 |
| 15B | 83 | $Y_2O_3$ | 5 | 5 | 5 | $HfO_2$ | 2 | 1550 × 6 × 0.01 | 1500 × 1 × 100 |
| 16B | 83 | $Y_2O_3$ | 5 | 5 | 5 | WC | 2 | 1550 × 6 × 0.01 | 1500 × 1 × 100 |
| 17B | 83 | $Y_2O_3$ | 5 | 5 | 5 | $MO_2C$ | 2 | 1550 × 6 × 0.01 | 1500 × 1 × 100 |
| 18B | 83 | $Y_2O_3$ | 5 | 5 | 5 | $Ta_2O5$ | 2 | 1550 × 6 × 0.01 | 1500 × 1 × 100 |
| 19B | 83 | $Y_2O_3$ | 5 | 5 | 5 | $Nb_2O5$ | 2 | 1550 × 6 × 0.01 | 1500 × 1 × 100 |
| 20B | 83 | $Y_2O_3$ | 5 | 5 | 5 | $Cr_2O3$ | 2 | 1550 × 6 × 0.01 | 1500 × 1 × 100 |
| 21B | 83 | $Y_2O_3$ | 5 | 5 | 5 | $TiO_2$ $ZrO_2$ | 1 1 | 1550 × 6 × 0.01 | 1500 × 1 × 100 |
| 22B | 83 | $Y_2O_3$ | 5 | 5 | 5 | $TiO_2$ $ZrO_2$ | 1 1 | 1600 × 6 × 0.01 | None |
| 23B | 85 | $CeO_2$ | 5 | 5 | 5 | | | 1550 × 6 × 0.01 | 1500 × 1 × 100 |
| 24B | 83 | $Er_2O_3$ | 7 | 5 | 5 | | | 1550 × 6 × 0.01 | 1500 × 1 × 100 |
| 25B | 83 | $Nd_2O_3$ | 7 | 5 | 5 | | | 1550 × 6 × 0.01 | 1500 × 1 × 100 |
| 26B | 83 | $Sm_2O_3$ | 7 | 5 | 5 | | | 1550 × 6 × 0.01 | 1500 × 1 × 100 |
| 27B | 83 | $Ho_2O_3$ | 7 | 5 | 5 | | | 1550 × 6 × 0.01 | 1500 × 1 × 100 |
| 28B | 83 | $Yb_2O_3$ | 7 | 5 | 5 | | | 1550 × 6 × 0.01 | 1500 × 1 × 100 |
| 29B | 83 | $Dy_2O_3$ | 7 | 5 | 5 | | | 1550 × 6 × 0.01 | 1500 × 1 × 100 |
| Comparative Example | | | | | | | | | |
| 5B | 89 | $Y_2O_3$ | 1 | 5 | 5 | | | 1550 × 6 × 0.01 | 1500 × 1 × 100 |
| 6B | 75 | $Y_2O_3$ | 15 | 5 | 5 | | | 1550 × 6 × 0.01 | 1500 × 1 × 100 |

TABLE 5-continued

Rolling Ball-Shaped Wear Resistant Member

| Sample | $Si_3N_4$ | Rare Earth Oxide | | $Al_2O_3$ | MgO | SiC | Other | | Sintering Condition Temp. × Time × Press. (° C.) × (hr) × (MPa) | HIP Condition Temp. × Time × Press. (° C.) × (hr) × (MPa) |
|---|---|---|---|---|---|---|---|---|---|---|
| 7B | 89 | $Y_2O_3$ | 5 | 1 | | 5 | | | 1550 × 6 × 0.01 | 1500 × 1 × 100 |
| 8B | 81 | $Y_2O_3$ | 5 | 9 | | 5 | | | 1550 × 6 × 0.01 | 1500 × 1 × 100 |
| 9B | 75 | $Y_2O_3$ | 5 | 5 | | 15 | | | 1550 × 6 × 0.01 | 1500 × 1 × 100 |
| 10B | 78 | $Y_2O_3$ | 5 | 5 | 5 | 5 | $TiO_2$ | 7 | 1550 × 6 × 0.01 | 1500 × 1 × 100 |

| Sample | Porosity (%) | Width of Aggregated Segregation in Liquid Phase (Grain Boundary Phase) (μm) Average | Width of Aggregated Segregation in Liquid Phase (Grain Boundary Phase) (μm) Maximum | Crush Strength (MPa) | Fracture Toughness (MPa·m$^{1/2}$) | Rolling Fatigue Life of Ball (hr) |
|---|---|---|---|---|---|---|
| Example | | | | | | |
| 4B | 0.01 | 1 | 2 | 235 | 6.8 | >400 |
| 5B | 0.02 | 0.6 | 1.5 | 275 | 6.9 | >400 |
| 6B | 0.02 | 0.4 | 1 | 230 | 6.5 | >400 |
| 7B | 0.08 | 1.5 | 2.5 | 220 | 6.5 | >400 |
| 8B | 0.02 | 1.5 | 2.5 | 215 | 6.6 | >400 |
| 9B | 0.08 | 0.5 | 1 | 230 | 6.8 | >400 |
| 10B | 0.02 | 1 | 2 | 250 | 6.6 | >400 |
| 11B | 0.01 | 0.5 | 1 | 285 | 6.8 | >400 |
| 12B | 0.01 | 0.4 | 1 | 270 | 6.8 | >400 |
| 13B | 0.01 | 0.4 | 1 | 225 | 6.5 | >400 |
| 14B | 0.01 | 0.6 | 1.5 | 270 | 6.8 | >400 |
| 15B | 0.01 | 0.5 | 1 | 270 | 6.9 | >400 |
| 16B | 0.01 | 0.5 | 1 | 240 | 6.7 | >400 |
| 17B | 0.01 | 0.5 | 1 | 260 | 6.8 | >400 |
| 18B | 0.01 | 0.5 | 1 | 245 | 6.8 | >400 |
| 19B | 0.01 | 0.5 | 1 | 240 | 6.8 | |
| 20B | 0.01 | 0.5 | 1 | 210 | 6.7 | >400 |
| 21B | 0.01 | 0.5 | 1 | 285 | 7.0 | >400 |
| 22B | 0.2 | 0.3 | 1 | 245 | 6.9 | >400 |
| 23B | 0.01 | 0.6 | 1.5 | 230 | 6.8 | >400 |
| 24B | 0.01 | 0.5 | 1.5 | 270 | 7.0 | >400 |
| 25B | 0.01 | 0.5 | 1 | 255 | 6.5 | >400 |
| 26B | 0.01 | 0.5 | 1.5 | 240 | 6.5 | >400 |
| 27B | 0.01 | 0.5 | 1 | 260 | 6.7 | >400 |
| 28B | 0.01 | 0.5 | 1 | 225 | 6.7 | >400 |
| 29B | 0.01 | 0.5 | 1.5 | 235 | 6.8 | >400 |
| Comparative Example | | | | | | |
| 5B | 0.2 | 0.7 | 1.5 | 195 | 5.9 | 295 |
| 6B | 0.05 | 2 | 4 | 190 | 5.8 | 200 |
| 7B | 1.5 | 0.5 | 1 | 200 | 6.4 | 225 |
| 8B | 0.01 | 1 | 2 | 200 | 6.3 | 330 |
| 9B | 1.5 | 0.3 | 1 | 175 | 5.8 | 230 |
| 10B | 0.02 | 0.7 | 1.5 | 195 | 6.3 | 260 |

TABLE 6

Rolling Ball-Shaped Wear Resistant Member

| Sample | $Si_3N_4$ | Rare Earth Oxide | | $Al_2O_3$ | MgO | SiC | Other | | Sintering Condition Temp. × Time × Press. (° C.) × (hr) × (MPa) | HIP Condition Temp. × Time × Press. (° C.) × (hr) × (MPa) |
|---|---|---|---|---|---|---|---|---|---|---|
| Example | | | | | | | | | | |
| 30B | 86 | $Y_2O_3$ | 5 | 2 | 2 | 5 | | | 1550 × 6 × 0.01 | 1500 × 1 × 100 |
| 31B | 84 | $Y_2O_3$ | 5 | 5 | 1 | 5 | | | 1550 × 6 × 0.01 | 1500 × 1 × 100 |
| 32B | 84 | $Y_2O_3$ | 5 | 4 | 2 | 5 | | | 1550 × 6 × 0.01 | 1500 × 1 × 100 |
| 33B | 86 | $Y_2O_3$ | 5 | 4 | 2 | 3 | | | 1550 × 6 × 0.01 | 1500 × 1 × 100 |
| 34B | 83 | $Y_2O_3$ | 5 | 3.5 | 1.5 | 5 | $TiO_2$ $ZrO_2$ | 1 1 | 1550 × 6 × 0.01 | 1500 × 1 × 100 |
| 35B | 83 | $Y_2O_3$ | 5 | 3.5 | 1.5 | 5 | $TiO_2$ $ZrO_2$ | 1 1 | 1550 × 6 × 0.01 | None |
| Comparative Example | | | | | | | | | | |
| 11B | 88 | $Y_2O_3$ | 5 | 1 | 1 | 5 | | | 1550 × 6 × 0.01 | 1500 × 1 × 100 |
| 12B | 81 | $Y_2O_3$ | 5 | 7 | 2 | 5 | | | 1550 × 6 × 0.01 | 1500 × 1 × 100 |

TABLE 6-continued

Rolling Ball-Shaped Wear Resistant Member

| 13B | 86.5 | Y$_2$O$_3$ | 5 | 3 | 0.5 | 5 | 1550 × 6 × 0.01 | 1500 × 1 × 100 |
| 14B | 81 | Y$_2$O$_3$ | 5 | 5 | 4 | 5 | 1550 × 6 × 0.01 | 1500 × 1 × 100 |

| Sample | Porosity (%) | Width of Aggregated Segregation in Liquid Phase(Grain Boundary Phase) (μm) | | Crush Strength (MPa) | Fracture Toughness (MPa·m$^{1/2}$) | Rolling Fatigue Life of Ball (hr) |
|---|---|---|---|---|---|---|
| | | Average | Maximum | | | |
| Example | | | | | | |
| 30B | 0.01 | 0.3 | 1 | 270 | 6.9 | >400 |
| 31B | 0.01 | 0.5 | 1.5 | 260 | 6.6 | >400 |
| 32B | 0.01 | 0.6 | 1.5 | 260 | 6.7 | >400 |
| 33B | 0.01 | 0.8 | 1.5 | 280 | 7.0 | >400 |
| 34B | 0.01 | 0.4 | 1 | 270 | 6.9 | >400 |
| 35B | 0.3 | 0.3 | 1 | 225 | 6.8 | >400 |
| Comparative Example | | | | | | |
| 11B | 1.5 | 0.5 | 1 | 190 | 6.2 | 225 |
| 12B | 0.01 | 0.8 | 2 | 205 | 6.2 | 280 |
| 13B | 1.2 | 0.5 | 1 | 180 | 6.5 | 245 |
| 14B | 0.01 | 1.8 | 3.5 | 195 | 6.4 | 255 |

As is clear from the results shown in Tables 5–6, in the respective silicon nitride rolling balls of Examples each of which was manufactured in such a manner that the material powder mixture containing specified amounts of various additives such as rare earth element, MgAl$_2$O$_4$ spinel, SiC or the like was molded and sintered, followed by being subjected to HIP treatment as occasion demanded after completion of the sintering process, the generation of the pore was effectively suppressed thereby to decrease the size of the aggregated segregation in the grain boundary to be extremely small. Therefore, there could be obtained the silicon nitride rolling balls each having a high crush strength and an excellent durability such that the rolling fatigue life exceeded 400 hours.

On the other hand, in the silicon nitride sintered bodies as shown in Comparative Examples 5B–14B in which the amount of additives such as rare earth components were set to outside the range specified in the present invention, even if the sintering operation and the HIP treatment were sufficiently performed, the rolling fatigue life of the rolling balls was lowered, and it was confirmed that the sintered bodies of Comparative Examples could not satisfy at least one of the required characteristics such as porosity, width of the aggregated segregation, three-point bending strength or the like that were specified in the present invention.

INDUSTRIAL APPLICABILITY

As described above, according to the silicon nitride wear resistant member and the method of manufacturing the member of the present invention, the material mixture is prepared by adding the predetermined amounts of the rare earth element, MgAl$_2$O$_4$ spinel or the mixture of magnesium oxide and aluminum oxide, silicon carbide, and compound of Ti, Zr, Hf or the like to the silicon nitride material powder, so that the sintering property is greatly improved. Therefore, even if the molded compact is sintered at a low temperature of 1600° C. or lower, there can be obtained a silicon nitride wear resistant member having an excellent wear resistance, a high density and a high mechanical strength that are equal to or higher than those of conventional silicon nitride sintered body. In particular, the silicon nitride wear resistant member is suitable for a material constituting a rolling bearing member in view of its excellent rolling life characteristics.

Further, the generation of pores is suppressed and a maximum size (diameter) of pore can be minimized, so that there can be obtained a wear resistant member excellent in rolling life characteristics and durability. Accordingly, when a bearing device is prepared by using this wear resistant member as rolling bearing member, good sliding/rolling characteristics can be maintained for a long time of period, and there can be provided a rotation machine having excellent operational reliability and durability.

What is claimed is:

1. A wear resistant member composed of silicon nitride sintered body containing 2–10 mass% of rare earth element in terms of oxide thereof as sintering agent, 2–7 mass % of MgAl$_2$O$_4$ spinel, 1–7 mass % of silicon carbide, and 0.5–5 mass % of at least one element selected from the group consisting of Ti, Zr, Hf, W, Mo, Ta, Nb and Cr in terms of oxide thereof, wherein a porosity of said silicon nitride sintered body is 1 vol. % or less, a three-point bending strength is 900 MPa or more, a fracture toughness is 6.3 MPa·m$^{1/2}$ or more, and a maximum width of aggregated segregation existing in grain boundary phase of the silicon nitride sintered body is 5 μm or less.

2. A wear resistant member composed of silicon nitride sintered body containing 2–10 mass % of rare earth element in terms of oxide thereof as sintering agent, 2–7 mass % of MgAl$_2$O$_4$ spinel, 1–7 mass % of silicon carbide, and 0.5–5 mass % of at least one element selected from the group consisting of Ti, Zr, Hf, W, Mo, Ta, Nb and Cr in terms of oxide thereof, wherein a porosity of said silicon nitride sintered body is 1 vol. % or less, a three-point bending strength is 900 MPa or more, a fracture toughness is 6.3 MPa·m$^{1/2}$ or more, and a average width of aggregated segregation existing in grain boundary phase of the silicon nitride sintered body is 2 μm or less.

3. A wear resistant member composed of silicon nitride sintered body containing 2–10 mass % of rare earth element in terms of oxide thereof as sintering agent, 1–2 mass % of magnesium oxide, 2–5 mass % of aluminum oxide, 1–7 mass % of silicon carbide, and 0.5–5 mass % of at least one element selected from the group consisting of Ti, Zr, Hf, W, Mo, Ta, Nb and Cr in terms of oxide thereof, wherein a porosity of said silicon nitride sintered body is 1 vol. % or less, a three-point bending strength is 900 MPa or more, and a fracture toughness is 6.3 MPa·m$^{1/2}$ or more, and a maximum width of aggregated segregation existing in grain boundary phase of the silicon nitride sintered body is 5 μm or less.

4. A wear resistant member composed of silicon nitride sintered body containing 2–10 mass % of rare earth element in terms of oxide thereof as sintering agent, 1–2 mass % of magnesium oxide, 2–5 mass % of aluminum oxide, 1–7 mass % of silicon carbide, and 0.5–5 mass % of at least one element selected from the group consisting of Ti, Zr, Hf, W, Mo, Ta, Nb and Cr in terms of oxide thereof, wherein a porosity of said silicon nitride sintered body is 1 vol. % or less, a three-point bending strength is 900 MPa or more, and a fracture toughness is 6.3 MPa·m$^{1/2}$ or more, and an average width of aggregated segregation existing in grain boundary phase of the silicon nitride sintered body is 2 μm or less.

5. A method of manufacturing a wear resistant member composed of silicon nitride sintered body comprising the steps of:
preparing a material mixture by adding 2–10 mass % of a rare earth element in terms of the amount of an oxide thereof, 2–7 mass % of MgAl$_2$O$_4$ spinel, 1–7 mass % of silicon carbide, and 0.5–5 mass % of at least one element selected from the group consisting of Ti, Zr, Hf, W, Mo, Ta, Nb and Cr in terms of oxide thereof, to a silicon nitride powder containing 1.5 mass % or less of oxygen and 90 mass % or more of α-phase type silicon nitride and having an average grain size of 1 μm or less;
molding said material mixture to form a compact;
degreasing said compact; and
sintering the compact in non-oxidizing atmosphere at a temperature of 1,600° C. or lower thereby to form a wear resistant member composed of silicon nitride sintered body.

6. A method of manufacturing a wear resistant member composed of silicon nitride sintered body comprising the steps of:
preparing a material mixture by adding 2–10 mass % of a rare earth element in terms of the amount of an oxide thereof, 1–2 mass % of magnesium oxide, 2–5 mass % of aluminum oxide, 1–7 mass % of silicon carbide, and 0.5–5 mass % of at least one element selected from the group consisting of Ti, Zr, Hf, W, Mo, Ta, Nb and Cr in terms of oxide thereof, to a silicon nitride powder containing 1.5 mass % or less of oxygen and 90 mass % or more of α-phase type silicon nitride and having an average grain size of 1 μm or less;
molding said material mixture to form a compact;
degreasing said compact; and
sintering the compact in non-oxidizing atmosphere at a temperature of 1,600° C. or lower thereby to form a wear resistant member composed of silicon nitride sintered body.

7. The method of manufacturing the wear resistant member composed of silicon nitride sintered body according to claim 5, wherein said method further comprising the step of: conducting a hot isostatic pressing (HIP) treatment to said silicon nitride sintered body in non-oxidizing atmosphere of 30 MPa or more at a temperature of 1,600° C. or lower after completion of the sintering step.

8. The method of manufacturing the wear resistant member composed of silicon nitride sintered body according to claim 6, wherein said method further comprising the step of: conducting a hot isostatic pressing (HIP) treatment to said silicon nitride sintered body in non-oxidizing atmosphere of 30 MPa or more at a temperature of 1,600° C. or lower after completion of the sintering step.

* * * * *